US012689651B2

(12) United States Patent
Krasik et al.

(10) Patent No.: US 12,689,651 B2
(45) Date of Patent: Jul. 21, 2026

(54) ONTOLOGY MAPPING SYSTEM

(71) Applicant: ThreatQuotient, Inc., Reston, VA (US)

(72) Inventors: David Krasik, New York, NY (US); Leon Ward, Reading (GB)

(73) Assignee: SECURONIX, INC., Plano, TX (US)

( * ) Notice: Subject to any disclaimer, the term of this patent is extended or adjusted under 35 U.S.C. 154(b) by 283 days.

(21) Appl. No.: 17/519,639

(22) Filed: Nov. 5, 2021

(65) Prior Publication Data

US 2022/0141234 A1 May 5, 2022

Related U.S. Application Data

(60) Provisional application No. 63/110,122, filed on Nov. 5, 2020.

(51) Int. Cl.
*H04L 9/40* (2022.01)
*G06F 21/55* (2013.01)
(Continued)

(52) U.S. Cl.
CPC .......... *H04L 63/145* (2013.01); *G06F 21/552* (2013.01); *G06F 21/566* (2013.01);
(Continued)

(58) Field of Classification Search
CPC . H04L 63/145; H04L 63/1416; G06F 21/552; G06F 21/566; G06F 21/568;
(Continued)

(56) References Cited

U.S. PATENT DOCUMENTS 8,302,193 B1 * 10/2012 Gardner ................. G06F 21/57
                                              707/769
8,375,450 B1 * 2/2013 Oliver ................... G06F 21/564
                                              713/181
(Continued)

OTHER PUBLICATIONS

Sebastián M, Rivera R, Kotzias p. Caballero J. Avclass: A tool for massive malware labeling. InResearch in Attacks, Intrusions, and Defenses: 19th International Symposium, RAID 2016, Paris, France, Sep. 19-21, 2016, Proceedings 19 2016 (pp. 230-253). Springer International Publishing. (Year: 2016).*

*Primary Examiner* — Michael R Vaughan
*Assistant Examiner* — Ethan V Vo
(74) *Attorney, Agent, or Firm* — Slayden Grubert Beard PLLC

(57) ABSTRACT

An article of manufacture includes a non-transitory medium including machine-readable instructions. The instructions are to be read and executed by a processor. The instructions, when read and executed by the processor, to cause the processor to receive a malware analysis of a malware from a computer security source and receive other malware analyses. Each other malware analysis is of another malware from another computer security source. The instructions may further cause the processor to perform a fuzzy matching algorithm to quantify a similarity of the malware analyses, determine that the malware is a same malware as other malware based upon results of the fuzzy matching algorithm, and later take a same corrective action for malware based upon a receipt of the malware analysis.

8 Claims, 7 Drawing Sheets

(51) Int. Cl.
    *G06F 21/56*         (2013.01)
    *G06N 7/02*         (2006.01)

(52) U.S. Cl.
    CPC ............. *G06F 21/568* (2013.01); *G06N 7/02*
        (2013.01); *H04L 63/1416* (2013.01)

(58) Field of Classification Search
    CPC . G06F 21/56; G06N 7/02; G06N 5/02; G06N
            5/048
    See application file for complete search history.

(56) References Cited

U.S. PATENT DOCUMENTS

| | | | | |
|---|---|---|---|---|
| 8,561,193 | B1 * | 10/2013 | Srivastava | G06F 21/563 |
| | | | | 726/25 |
| 9,584,541 | B1 * | 2/2017 | Weinstein | H04L 63/1441 |
| 11,025,649 | B1 * | 6/2021 | Bilge | H04L 63/1416 |
| 11,886,586 | B1 * | 1/2024 | Chang | G06F 21/566 |
| 2008/0263669 | A1 * | 10/2008 | Alme | G06F 21/56 |
| | | | | 726/24 |
| 2013/0061325 | A1 * | 3/2013 | Singh | H04L 63/145 |
| | | | | 726/24 |
| 2013/0326625 | A1 * | 12/2013 | Anderson | G06F 21/566 |
| | | | | 726/23 |
| 2016/0323295 | A1 * | 11/2016 | Joram | H04L 63/145 |
| 2016/0357965 | A1 * | 12/2016 | Prowell | G06F 21/566 |
| 2017/0251003 | A1 * | 8/2017 | Rostami-Hesarsorkh | |
| | | | | G06N 5/01 |
| 2017/0264626 | A1 * | 9/2017 | Xu | H04L 63/1425 |
| 2018/0115570 | A1 * | 4/2018 | Ollmann | H04L 63/145 |
| 2019/0104139 | A1 * | 4/2019 | Xu | H04L 63/1416 |
| 2019/0182273 | A1 * | 6/2019 | Walsh | H04L 63/1425 |
| 2019/0238566 | A1 * | 8/2019 | Wang | G06F 21/564 |
| 2020/0074080 | A1 * | 3/2020 | Srinivasagopalan | |
| | | | | G06F 16/2462 |
| 2020/0334353 | A1 * | 10/2020 | Kosarev | G06F 21/53 |
| 2021/0344696 | A1 * | 11/2021 | Lancioni | G06F 16/2255 |

* cited by examiner

46 Indicators Contain

| CrowdStrike:Malware Family: SigmaRansomware |
| --- |

585 Indicators Contain

| Cofense Intelligence:Malware Family: Sigma Ransomware |
| --- |

SigmaRansomware $\neq$ Sigma Ransomware

97% Similarity Score $n_{CS} = 46$                          $n_{CI} = 585$

| Smart Attribute Malware Family:Sigma Ransomware $n_{SA} = 631$ |
| --- |

FIG. 2

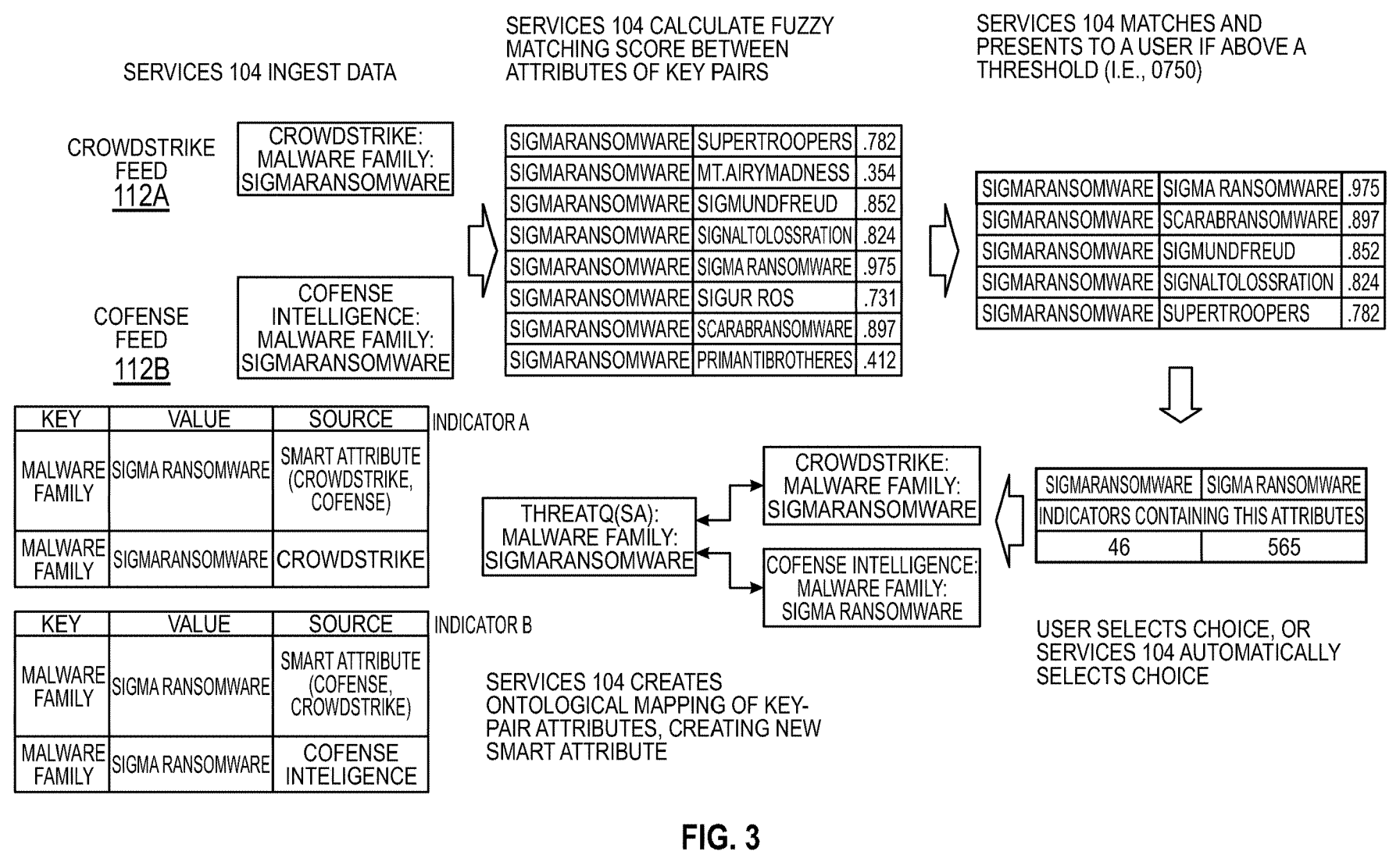

SERVICES 104 INGEST DATA

CROWDSTRIKE FEED 112A

| KEY | VALUE | SOURCE |
|---|---|---|
| MALWARE FAMILY | SIGMA RANSOMWARE | SMART ATTRIBUTE (CROWDSTRIKE, COFENSE) |
| MALWARE FAMILY | SIGMARANSOMWARE | CROWDSTRIKE |

INDICATOR A

COFENSE FEED 112B

| KEY | VALUE | SOURCE |
|---|---|---|
| MALWARE FAMILY | SIGMA RANSOMWARE | SMART ATTRIBUTE (COFENSE, CROWDSTRIKE) |
| MALWARE FAMILY | SIGMA RANSOMWARE | COFENSE INTELIGENCE |

INDICATOR B

CROWDSTRIKE:
MALWARE FAMILY:
SIGMARANSOMWARE

COFENSE
INTELLIGENCE:
MALWARE FAMILY:
SIGMARANSOMWARE

SERVICES 104 CALCULATE FUZZY
MATCHING SCORE BETWEEN
ATTRIBUTES OF KEY PAIRS

| | |
|---|---|
| SIGMARANSOMWARE | SUPERTROOPERS | .782 |
| SIGMARANSOMWARE | MT.AIRYMADNESS | .354 |
| SIGMARANSOMWARE | SIGMUNDFREUD | .852 |
| SIGMARANSOMWARE | SIGNALTOLOSSRATION | .824 |
| SIGMARANSOMWARE | SIGMA RANSOMWARE | .975 |
| SIGMARANSOMWARE | SIGUR ROS | .731 |
| SIGMARANSOMWARE | SCARABRANSOMWARE | .897 |
| SIGMARANSOMWARE | PRIMANTIBROTHERES | .412 |

SERVICES 104 MATCHES AND
PRESENTS TO A USER IF ABOVE A
THRESHOLD (I.E., 0750)

| | |
|---|---|
| SIGMARANSOMWARE | SIGMA RANSOMWARE | .975 |
| SIGMARANSOMWARE | SCARABRANSOMWARE | .897 |
| SIGMARANSOMWARE | SIGMUNDFREUD | .852 |
| SIGMARANSOMWARE | SIGNALTOLOSSRATION | .824 |
| SIGMARANSOMWARE | SUPERTROOPERS | .782 |

| SIGMARANSOMWARE | SIGMA RANSOMWARE |
|---|---|
| INDICATORS CONTAINING THIS ATTRIBUTES | |
| 46 | 565 |

USER SELECTS CHOICE, OR
SERVICES 104 AUTOMATICALLY
SELECTS CHOICE

THREATQ(SA):
MALWARE FAMILY:
SIGMARANSOMWARE

CROWDSTRIKE:
MALWARE FAMILY:
SIGMARANSOMWARE

COFENSE INTELLIGENCE:
MALWARE FAMILY:
SIGMA RANSOMWARE

SERVICES 104 CREATES
ONTOLOGICAL MAPPING OF KEY-
PAIR ATTRIBUTES, CREATING NEW
SMART ATTRIBUTE

FIG. 3

| | |
|---|---|
| COFENSE INTELLIGENCE:MALWARE FAMILY:CLIENT MAXIMUS | COFENSE INTELLIGENCE:DESCRIPTION:CLIENT MAXIMUS BANKING TROJAN |
| COFENSE INTELLIGENCE:MALWARE FAMILY:FORMBOOK STEALER | COFENSE INTELLIGENCE:DESCRIPTION:FORMBOOK INFORMATION STEALER |
| COFENSE INTELLIGENCE:MALWARE FAMILY:FORMBOOK STEALER | COFENSE INTELLIGENCE:MALWARE FAMILY:FORMBOOK |
| COFENSE INTELLIGENCE:MALWARE FAMILY:GANDCRAB RANSOMWARE | CROWDSTRIKE:MALWARE FAMILY:GANDCRAB |
| COFENSE INTELLIGENCE:MALWARE FAMILY:DELOADER | COFENSE INTELLIGENCE:DESCRIPTION:DELOADER ZEUS VARIANT |
| COFENSE INTELLIGENCE:MALWARE FAMILY:DREAMBOT | COFENSE INTELLIGENCE:DESCRIPTION:DREAMBOT TOR-BASED TROJAN |
| COFENSE INTELLIGENCE:MALWARE FAMILY:DRIDEX | MISP IMPORT:COMMENT:DRIDEX DOCUMENT |
| COFENSE INTELLIGENCE:MALWARE FAMILY:DRIDEX | MISP IMPORT:COMMENT:DRIDEX SAMPLE |
| COFENSE INTELLIGENCE:MALWARE FAMILY:H-WORM | CROWDSTRIKER:MALWARE FAMILY:HWORM |
| COFENSE INTELLIGENCE:MALWARE FAMILY:LOKI BOT | CROWDSTRIKER:MALWARE FAMILY:LOKIBOT |
| COFENSE INTELLIGENCE:MALWARE FAMILY:NEUTRINO BOT | CROWDSTRIKER:MALWARE FAMILY:NEUTRINOBOT |
| COFENSE INTELLIGENCE:MALWARE FAMILY:SCARAB RANSOMWARE | CROWDSTRIKER:MALWARE FAMILY:SCARABRANSOMWARE |
| COFENSE INTELLIGENCE:MALWARE FAMILY:SCARAB RANSOMWARE | ISIGHT PARTNERS:MALWARE FAMILY:SCARAB |
| COFENSE INTELLIGENCE:MALWARE FAMILY:SMOKE LOADER | CROWDSTRIKER:MALWARE FAMILY:SMOKELOADER |
| COFENSE INTELLIGENCE:MALWARE FAMILY:GLOBEIMPOSTER | COFENSE INTELLIGENCE:DESCRIPTION:GLOBEIMPOSTER RANSOMWARE |
| COFENSE INTELLIGENCE:VECTOR:DOWNLOAD | VERISIGN IDEFENSE INTELGRAPH:VECTOR:MALWARE_DOWNLOAD |
| CROWDSTRIKE:MALWARE FAMILY::GOODOOR | CROWDSTRIKE:MALWARE FAMILY:GOODOR |
| COFENSE INTELLIGENCE:MALWARE FAMILY:KEYLOGGER | VERISIGN IDEFENSE INTELGRAPH:MALWARE FAMILY:HAWKEYE KEYLOGGER |
| COFENSE INTELLIGENCE:MALWARE FAMILY:LOCKY | COFENSE INTELLIGENCE:DESCRIPTION:LOCKY ENCRYPTION RANSOMWARE |
| CROWDSTRIKE:MALWARE FAMILY:GOODOR | CROWDSTRIKE:MALWARE FAMILY:GOODOOR |
| CROWDSTRIKE:MALWARE FAMILY:GRANDCRAB | CROWDSTRIKE:MALWARE FAMILY:GANDCRAB |
| CROWDSTRIKE:MALWARE FAMILY:HWORM | COFENSE INTELLIGENCE:MALWARE FAMILY:H-WORM |
| COFENSE INTELLIGENCE:MALWARE FAMILY:NYMAIM | MISP IMPORT:COMMENT:NYMAIM DOCUMENT |
| COFENSE INTELLIGENCE:MALWARE FAMILY:NYMAIM | MISP IMPORT:COMMENT:EXAMPLE NYMAIM DOWNLOAD |
| CROWDSTRIKE:MALWARE FAMILY:KHRAT | CROWDSTRIKE:MALWARE FAMILY:K4RAT |
| CROWDSTRIKE:MALWARE FAMILY:LOKIBOT | COFENSE INTELLIGENCE:MALWARE FAMILY:LOKI BOT |

FIG. 4

ONTOLOGY MAPPING SYSTEM

PRIORITY

This application claims priority to U.S. Provisional Patent Application No. 63/110,122 filed Nov. 5, 2020, the contents of which are hereby incorporated in their entirety.

FIELD

The present disclosure relates to cyber security of electronic devices and, more particularly, to an ontology mapping system.

BACKGROUND

Malware may refer generally to any category of automated threat to the security of electronic devices. Malware may include computer viruses, worms, Trojan software, rootkits, stealth programs, ransomware, registry key exploits, application programming interface (API) exploits, malicious schedule tasks, adware, malvertising, spyware, denial of service attacks, or phishing scams.

Different malware, and the permutations of versions thereof, as well as the origination or vector of attack thereof, may represent different threat analyses. Security analysts and other users of security software may be overwhelmed with threat analyses that are newly created or discovered every day from multiple sources in multiple formats. This may include threat analysis identified from external commercial sources, open source, industry and existing security vendors as well as internal sources. Furthermore, each computer security program may generate a massive amount of logs, events, and alerts. Through such overwhelming amounts of information, software security programs may become unusable or unable to accurately warn a user of actual threats to an electronic device or system. Embodiments of the present disclosure may address one or more of these issues identified by inventors of embodiments of the present disclosure.

DESCRIPTION OF DRAWINGS

FIG. 2 is an illustration of an example evaluation of different key pair threat analyses, according to embodiments of the present disclosure.

FIG. 3 is a diagram illustrating a workflow for generating a smart attribute, such as the smart attribute shown in FIG. 2, according to embodiments of the present disclosure.

FIG. 4 is a chart of additional, example possible matches, according to embodiments of the present disclosure.

DETAILED DESCRIPTION

Figure 1:
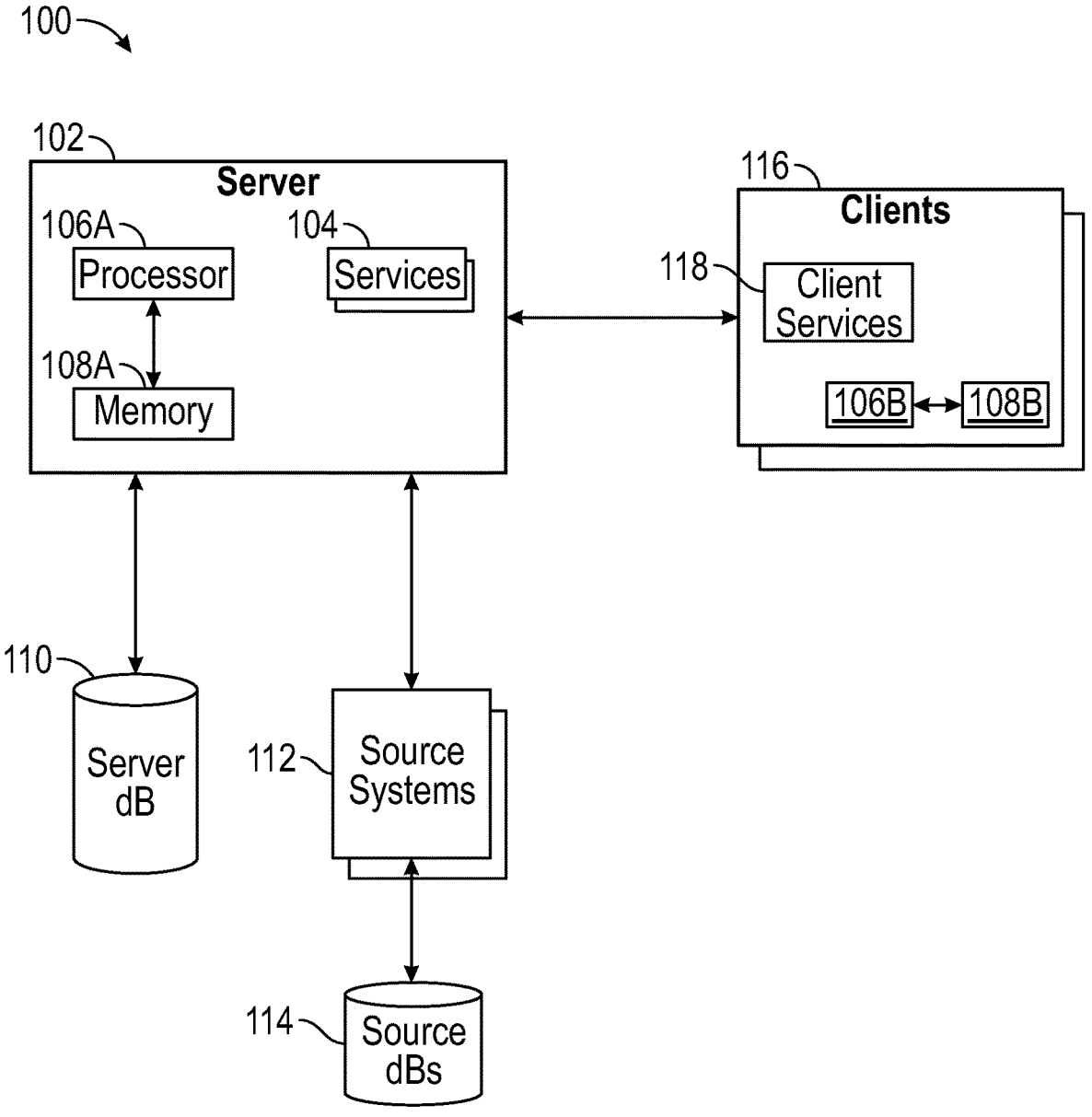
FIG. 1 is an illustration of an example system 100 for ontology mapping for threat analysis, according to embodiments of the present disclosure.

The following describes a system for processing cyber threat analysis to assist cyber threat intel professionals in generating a normalized, reusable ontology to organize, describe and transact threat intelligence and anti-malware analysis.

Inventors of embodiments of the present disclosure have discovered that one of the primary challenges in generating a mapping of this nature is to identify, from a wide array of threat analyses from disparate sources, those analyses that are suitable for mapping. For example, for a highly unique long string of text identifying malware, it may be unlikely to find any other threat analysis in a set that is semantically equivalent and therefore worthy of mapping to it.

Embodiments of the present disclosure may include a system that provides a mapping process that synthesizes malware analysis to filter out analysis that is irrelevant to a mapping exercise. The output of this evaluation may include filtered malware analysis including a mapping of disparate malware analyses that is used to evaluate malware.

In one embodiment, the system may be configured to evaluate various malware analyses for semantic equivalence. A number of automated methodologies can be employed, such as fuzzy string matching algorithms. Additionally, reference dictionaries of commonly matched malware analyses can be employed as well. The output of the evaluation may include a list of malware analyses that are grouped together with a similarity score and a mapping recommendation. For example, within a set of threat analyses, there may be 500 instances of the analysis of malware known as "Malware Family: Sigma Ransomware," and 100 instances of the analysis of malware known as "Malware SigmaRansom". It may be concluded by the system that these two sets of analyses relate to the same underlying malware, and information The system may assess the relative similarity between the two analyses based on matching and dictionary methods, and return a semantic similarity score for the pairing. Should this score exceed a given threshold, it may be marked as a candidate for mapping. Next, the system may evaluate which of the two similar analyses is to be a primary value that will represent both analyses. In making this recommendation, the system may factor in frequency of occurrence (e.g. 500 instances vs. 100) as well as reference dictionaries (such as master lists). The similarity scoring and mapping recommendation may then be presented to a user to confirm, deny, or alter the mapping, or may be performed automatically. The system may iterate through the entire relevant set of analyses and enable mapping of various analyses together.

While the initial mapping of an existing set of analyses may be a large one-time task, the system may be configured to also respond dynamically to changing threat analysis. A standard threat intelligence agent may receive analysis and data on an daily, hourly, or real time basis hundreds of sources. Recommended mappings may change over time. The system may be configured to account for this dynamic behavior and alter mapping changes. This may be performed with a process to regularly reevaluate mapping recommendations as new analysis and data is added. Triggers for reevaluation may include additional instances of an existing analysis or entirely new analysis that have similarity scores with existing analysis.

Embodiments of the present disclosure may enable sharing threat analyses across organizations. These embodiments may provide significant benefits in synthesizing threat analyses through speaking a common language when collaborating between organizations. While some higher level taxonomy standards such as STIX are available, they merely address taxonomy structure and do little to address challenges of threat analysis semantics and the more granular and varied contextual intelligence.

FIG. 1 is an illustration of an example system 100 for ontology mapping for threat analysis, according to embodiments of the present disclosure. System 100 may include any suitable number and kind of components. For example, system 100 may include a server 102, one or more clients 116, and one or more source systems 112.

Server 102 may be configured to execute one or more services 104. Services 104 may include applications to be implemented by analog circuitry, digital circuitry, instructions stored in a memory 108A for execution by a processor 106A, or any suitable combination thereof. Services 104 may include applications for, for example, ontological structure and mapping, threat analysis preparation, mapping recommendations, ongoing maintenance, mapping sharing, and mapping aggregation.

Server 102 may be configured to access threat analyses from any suitable source. For example, server 102 may be configured to access disparate threat analysis sources from one or more source systems 112. Source systems 112 may be implemented fully or in part as source databases 114, connected to source databases 114, or may include software or services. Such software or services may include applications to be implemented by analog circuitry, digital circuitry, instructions stored in a memory for execution by a processor, or any suitable combination thereof. Source systems 112 may include information about various malware or other security threats to computer systems. Such information may be provided to server 102 on-demand, periodically, on a push or pull basis, or upon any suitable criteria or in any suitable manner. Server 102 may be configured to store its own information on a server database 110, located remotely, within, or without server 102.

Clients 116 may be configured to access server 102 to receive information determined by server 102. Clients 116 may implement one or more client services 118. Client services 118 may include applications to be implemented by analog circuitry, digital circuitry, instructions stored in a memory 108B for execution by a processor 106B, or any suitable combination thereof. Clients 116 may be implemented on a same or different systems than source systems 112. Clients 116 may remotely or locally access services 104 through client services 118 in any suitable manner. Client services 118 may implement any suitable anti-malware or computer security applications. Client services 118 may be implemented as companion software to services 104. Client services 118 may be configured to access services 104 in any suitable manner, such as through web services, API calls, or any other suitable communication protocol, format, or invocation method. Similarly, services 104 may be configured to access client services 118 in any suitable manner.

Services 104 may be configured to act as a "single source of truth" for clients 116. Clients 116, rather than accessing many different instances of source systems 112, may be configured to access server 102 and services 104. The information from source systems 112 may be distilled, organized, or otherwise transformed and available through services 104. The information from different source systems 112 might be inconsistently labeled, stored, or have different semantic meanings, terminology, etc. Services 104 may be configured to identify different threats that are in fact one in the same. Services 104 may be configured to wrap such information into a taxonomy or ontology mapping for access by clients 116. Clients 116 may be configured to share such a taxonomy or ontology mapping with other instances of clients 116. Moreover, services 104 may be configured to provide default or suggested taxonomy or ontology mapping to clients 116. Such a suggested taxonomy or ontology mapping may be based upon the particular sources of information to be used by clients 116.

Services 104 may be configured to store threat analysis in key-value pairs. Services 104 may identify a set of threat analysis to which a given datum from sources systems 112 is to belong. Differences between threat analysis from source systems 112 may include any suitable permutation of threat analysis. The differences may include a difference in the label or definition of a "key" of a key-value pair or a difference in the label or definition of a "value" of a key-value pair of threat analysis. For example, a first source system may define a "country of origin" as "China" for a given threat, while a second source system may define a "region of origin" of the given threat as "Asia/Pacific." In such a case, both the key and the value are disparately defined and labeled. In another example, both sources may define a "region of origin" but one source may have "Asia" as the value and the other source may have "Asia/Pacific" as the value. In another example, a given threat may be named differently in different source systems 112. A first source system may label the threat as, for example, "SigmaRansomware" and a second source system may label the same threat as, for example, "Sigma Ransomware." Other permutations may include a definition of a malware family to which the threat belongs, and particular attack vectors, techniques, tactics, or target weaknesses. Although described as a pair, key-values may have further hierarchical levels and structures.

Services 104 may collect key-value pairs and other hierarchical information from source systems 112. Services 104 may attempt to reconcile inconsistencies between threat analyses from source systems 112 in any suitable manner. In one embodiment, services 104 may perform a fuzzy match or other quantifiable similarity comparison between different keys, values, or key-value pairs. Services 104 may be configured to apply a threshold value to such an analysis, wherein matches that are greater than N % (or other suitable quantification metric) are determined to be candidates to be the same element. Services 104 may be configured to apply multiple such thresholds. For example, for a first of two thresholds, such as a lower threshold, services 104 may be configured to present such candidate matches to a user for further selection or determination that the matches are the same element. For a second of the two thresholds, such as a higher threshold, services 104 may be configured to automatically determine that such candidate matches are the same element. Services 104 may be configured to select, as the preferred primary key-value identity, the candidate key-value of the matches that is the most commonly used among a set of threat analyses. Such a candidate might be selected as the most commonly used in terms of sheer instances of key-value pairs or the most commonly used in terms of the number of source systems 112 using such a candidate.

FIG. 2 is an illustration of an example evaluation of different key pair threat analyses, according to embodiments of the present disclosure. The evaluation may be performed by, for example, services 104, drawing threat analyses from two difference source systems 112.

For example, as shown in FIG. 2, 46 instances of threat analyses may include the key pair "CrowdStrike:Malware Family:SigmaRansomware" while 585 instances of threat analyses may include the categorization "Cofense Intelligence:Malware Family:SigmaRansomware".

The two key pair instances may differ according to a source of the threat analyses—CrowdStrike vs. Cofense Intelligence. CrowdStrike and Cofense may be example anti-malware software or services that are independently maintained. Services 104 may interpret this as potential threat analyses that can be combined. The next level of the hierarchy may be the same, "Malware Family". However, the first key pair uses "Sigma Ransomware" as the threat analysis and the second key pair uses "SigmaRansomware" as the threat analysis. Services 104 may determine that these key-value pairs are 97% similar. Services 104 may create a new smart attribute as a superset of these threat analysis sources as "Malware Family: Sigma Ransomware", using the more common threat analysis implementation.

Thus, services 104 may be configured to find semantically equivalent attributes produced by different source systems 112. Attributes identified as unique but highly similar to other attribute instances through similar text values may be proposed as candidates for a match. A user may be presented with potential or suggested matches, as well as the instance count for each candidate. A user, or services 104 acting automatically, can then generate a smart attribute wherein the two source attributes are mapped to the new smart attribute. This new smart attribute may be used for future queries and other uses.

For example, the first key pair may have been found in 46 various indicator instances. The second key pair may have been found in 585 various indicator instances. The second key pair may be selected automatically or default as the key value or the analysis value or both. The count for the smart attribute or resultant key pair may be 631. Subsequent malware determinations may use the larger of the two threat analysis instances, such as the second key pair. However, over time, if the first key pair instance count exceeds the second key pair instance count, malware determinations may use the first key pair. The mapping of key pairs to a smart attribute may be managed to control the use thereof.

Accordingly, services 104 may solve the technical challenge encountered by clients 116 upon making an anti-malware determination for candidate behavior or malware. Clients 116, upon encountering malware, may utilize the determinations by services 104 to correctly analyze malware through accessing disparate and distributed anti-malware services and sources, such as source systems 112. The anti-malware services and sources, such as systems 112, may conflict as described above, wherein a first key pair may be found in 46 threat instances in source systems 112 and a second key pair may be found in 585 threat instances in source systems 112, often from disparate entities. Services 104 may synthesize this disparate anti-malware analysis by choosing and standardizing analyses, such as selecting a particular key-pair for a larger set of possible key-pairs that are of a same analysis. The result is a standardized (at least within the system) threat analysis that may be made available clients 116, which may more efficiently then apply anti-malware protocols based upon this standardized threat analysis. Moreover, as new key pairs are encountered by clients 116 from source systems 112, and such key pairs of are an anti-malware analysis that matches a known anti-malware analysis, the incorporation of the new key pair into a mapping that includes the existing, known anti-malware analysis may provide an ability to extend the newly encountered analysis for the client 116 that encountered the new key pair. For example, the client 116 that encountered the new key pair may be able to apply the threat analysis for the malware of the new key pair in combination with the other threat analyses for the same malware but marked by different key pairs.

FIG. 3 is a diagram illustrating a workflow for generating a smart attribute, such as the smart attribute shown in FIG. 2, according to embodiments of the present disclosure. FIG. 3 illustrates services 104 identifying attributes of threats from different sources, according to embodiments of the present disclosure. Only two are shown here for simplicity, while a larger such identification list is illustrated in FIG. 4. Threat analysis from two instances of source systems 112, including Crowdstrike and Cofense, are show. The above Sigma Ransomware example of FIG. 2 is used.

First, services 104 may read or ingest threat analysis from source systems 112. One such source may be a Crowdstrike database or feed, represented as source system 112A. Another such source may be a Cofense database or feed, represented as source system 112B.

Services 104 may then be configured to calculate a fuzzy matching score between attributes of these key pairs and other key pairs. These other key pairs may have been received from still other source systems 112 (not shown), and may include, for example, SuperTroopers, Mt.AiryMadness, SigmundFreud, Singaltolossration, Sigur Ros, ScarabRansomeware, and PrimantiBrotheres. These other fields may represent yet other designations of threat indicators. Example fuzzy matching scores between "SigmaRansomware" and these other values (including "Sigma Ransomware" are shown. The fuzzy matching scores may be calculated in any suitable manner, and may score differences in characters, offsets of characters, additional characters, fewer characters, etc.

As shown in FIG. 3, the attribute "SigmaRansomware" matches, to varying degrees, other attributes. It may match "Sigma Ransomware" with a 0.975 score. It may also match other attributes to a significant degree, such as "ScarabRansomware" with a 0.897 score.

Services 104 may then be configured to rank and present candidates to a user for possible ontological mapping. This step may be omitted if the candidates will be selected automatically without user input. For example, a candidate match may be automatically selected if the match threshold is above 0.975. The candidates presented may be those candidates with a match above a threshold of, for example, 0.750.

A match may be selected. The selection may be automatic or may be made by an end user. For example, the "SigmaRansomware" and "Sigma Ransomware" values may be selected to be combined into a smart attribute or smart key pair. A relative or absolute count of each attribute may be presented to the user, so that the user can observe which is more commonly used. A specific one of the candidate values may be selected as the value to be used as the designation in the smart attribute to be created. For example, "Sigma Ransomware" may be selected as this is the most common value from the threat analysis. In another example, "SigmaRansomware" may be selected as a convention to avoid use of spaces within these values.

Services 104 may be configured to then create an ontological mapping of the selected values into a new smart key pair or smart attribute. This is shown logically and in an example database listing form in FIG. 3. The new smart pair may be designated by "ThreatQ(SA)" as the source, representing services 104, "Malware Family" as the next portion of the key, and "SigmaRansomware" as the selected value to represent the constituent values that have been combined into the smart attribute. Each of the key-pairs from source systems 112A, 112B may now map to the new smart pair. Moreover, in a listing of the key-pairs, the key-pairs from sources 112A, 112B may be co-listed with the new smart pair. The smart attribute may be stored in, for example, database 110.

FIG. 4 is a chart of additional, example possible matches, according to embodiments of the present disclosure.

For example, a key attribute of "Malware Family" may match to a key attribute of "Description", or at least values from such key attributes may be compared with one another. Similarly, "Malware Family" may match to a key attribute of "Comment", or at least values from such key attributes may be compared with one another.

In the following examples, the values of the key attributes "Malware Family" and the values of the other comparable key attributes identified above may be compared. These comparisons may be made without reference to a top-level key attribute, which may identify a source system 112, such as Cofense or CrowdStrike.

The value "Client Maximus" may match to the value of "Client Maximus Banking Trojan". This may be performed wherein "Client Maximus" does not commonly refer to malware threats other than the "Client Maximus Banking Trojan."

The value "Formbook Stealer" may match the values "Formbook" or "Formbook Information Stealer."

The value "GandCrab Ransomware" may match the value "GandCrab".

The value "DEloader" may match the value "DELoader Zeus Variant".

The value "Dreambot" may match the value "Dreambot Tor-based Trojan".

The value "Dridex" may match the values "Dridex Document" and "Dridex sample".

The value "H-worm" may match the value "Hworm".

The value "Loki Bot" may match the value "LokiBot".

The value "Neutrino Bot" may match the value "NeutrinoBot".

The value "Scarab Ransomware" may match the values "ScarabRansomware" and "Scarab".

The value "Smoke Loader" may match the value "Smoke-Loader".

The value "GlobeImposter" may match the value "GlobeImposter Ransomware".

The value "Goodoor" may match the values "Goodor.

The value "Keylogger" may match the value "HawkEye Keylogger".

The value "Locky" may match the value "Locky encryption ransomware".

The value "GrandCrab" may match the value "GandCrab".

The value "Hworm" may match the value "H-worm".

The value "Nymaim" may match the values "Nymaim Document" or "Example Nymain Download".

The value "KHRAT" may match the value "K4RAT".

The value "LokiBot" may match the value "Loki Bot".

In another example, the values of the key attributes "Vector" from a variety of source systems 112 may be compared, without reference to a top-level key attribute, which may identify a source 112, such as Cofense or CrowdStrike. The value "Download" may match the value "MALWARE_DOWNLOAD".

In presenting candidate matches to a user for evaluation, or in performing the similarity analysis, services 104 may be configured to perform various methods to make these processes more efficient. For example, services 104 may perform exclusions on candidate matches. Services 104 may exclude text strings that are completely made up of numbers, long strings that are longer than a threshold length, file names, hashes, and certain source:key pairs unlikely to provide matches. These might have no semantic meaning. In execution of the matching algorithm discussed above, eventually all values may be compared against all other values. However, it some embodiments certain values may be prioritized for search. For example, a given source system 112 used by a given client 116 may have its threat analysis prioritized for evaluation to find candidate matches. Services 104 may provide ranking of candidate matches based on a likelihood that the candidate matches should be mapped. This may include a similarity score, as discussed above. Moreover, it may include a ranking based upon the key attribute. For example, a given user might prefer prioritization of mapping based upon malware family or specific kinds of malware families. Services 104 may maintain a dictionary to influence the mapping workflow. The dictionary may dictate the priorities, or the strings to ignore. The dictionary may be stored in, for example, database 110.

The mappings created by services 104 may be portable and defined in any suitable manner. They may be stored in server database 110 or shared with or between clients 116. The mappings may be distributed locally or hosted in a central location. Moreover, the relevance scores and prioritizations of, for example, malware family over country of origin, may be noted in the mappings and shared.

Figure 5:
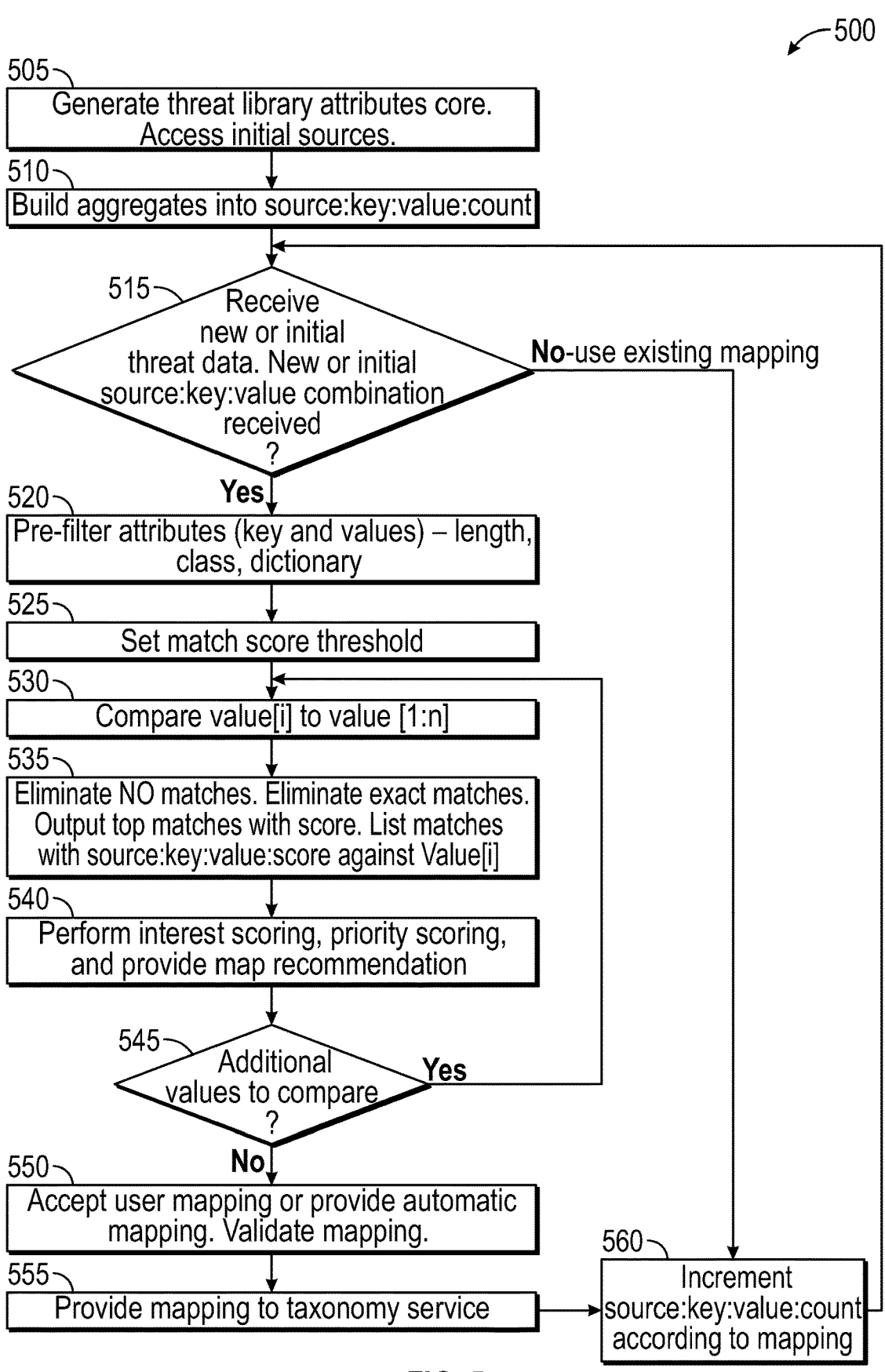
FIG. 5 is an illustration of a method performed by services for providing ontological mappings of two or more source attributes to a smart attribute, according to embodiments of the present disclosure.

FIG. 5 is an illustration of a method 500 performed by services 104 for providing ontological mappings of two or more source attributes to a smart attribute, according to embodiments of the present disclosure. Method 500 may be performed by any suitable entity, such as a mapping service of services 104. Moreover, method 500 may be performed by client services 118. Method 500 may be performed by instructions stored on a non-transitory machine-readable medium and executed by a processor.

At step 505, a core library of threat attributes may be generated. The library may be generated from any suitable number and kind of source systems 112. At step 510, the individual threat attributes may be aggregated. The threat attributes may be assembled into a source:key:value:count tuple.

At step 515, new or initial threat analysis may have been received. The first time step 515 executes, initial threat analysis may have been received as a result of execution of steps 505 and 515. Method 500 may then proceed to step 520. Upon subsequent executions of step 515, it may be determined whether the new threat analysis is a new source: key:value tuple. If so, method 500 may proceed to step 520. Otherwise, method 500 may proceed to step 560 and existing mappings may be used.

At step 520, an initial threat analysis aggregation may begin to be processed, or a new threat analysis tuple may begin to be processed in view of existing mappings. Specifically, the threat analysis received may be pre-filtered. Such pre-filtering may be based on any suitable attributes, such as the key or the values. The length, class of threat analysis, as well as a dictionary of proper nouns or other terms may be considered. Some terms may be ignored. The pre-filtering may be made on the basis of values that have no
semantic meaning, as discussed above.

At step 525, a match score threshold may be set.

At step 530, a given value, denoted as Value[i], of the
range of key pair values to be evaluated, may be compared
against each of the other key pair values, denoted as
Value[1 . . . n]. The given value may be a first of the initial
values retrieved in steps 505, 510, or may be a new value
determined in step 515. The comparison may be made with
a fuzzy algorithm as discussed above. Moreover, results of
the fuzzy algorithm may be weighted. The weighting may be
provided by an administrator setting or preference, or dic-
tionary setting. Furthermore, the weighting may be provided
by a relative At step 535, top matches above a given threshold may be
output to a user. Matches of the given value to existing
values may be identified along with relative or absolute
differences.

At step 540, interest scoring and priority scoring may be
performed. A mapping of the value to an existing value may
be provided, or a mapping of two existing values to a new
smart value may be provided. The mapping may be selected
by a user or performed automatically.

At step 545, it may be determined whether there are
additional values to compare. For example, in an initial
execution of step 545, additional, initial aggregated values
may be evaluated. If so, method 500 may return to step 530.
Otherwise, method 500 may proceed to step 550.

At step 550, the user mapping or the automatically
determined mapping may be accepted. The mapping may be
validated against any suitable source. If the tuple has never
been encountered before, or has no equivalent tuples that
match, the tuple itself may become a new smart attribute. If At step 555, the mapping may be provided to a taxonomy
service for storage, presentation to users, presentation to
other systems, or any other suitable purpose.

At step 560, the tuple of the source:key:value:count for
the resultant mapping, whether identified as an existing
known key value pair, a newly discovered key value pair, or
a merging of key value pairs into a smart attribute, may be
incremented so a count may be maintained.

The received threat analysis may be newly added to an
existing key value pair (such as determined in steps 520-555
after the YES branch of step 515), or may have been newly
discovered (such as determined in steps 520-555 after the
YES branch of step 515), or may have matched an existing
mapping (such as determined from the NO branch of step
515). In step 560, subsequent encounters of the underlying
malware of the threat analysis may be addressed with a
corrective action. Such corrective action may be performed
by, for example, clients 118. Upon receiving threat analysis
matching the smart attribute that already existed or was
newly created in FIG. 5, corrective actions specific to the
superset of the threat analyses matching the underlying
malware may be applied. The threat analyses, albeit from
disparate sources, may be applied together through mapping
of the smart attribute. For example, the malware may be
encountered and categorized according to a received threat
analysis. No corrective action might be available to client
118 with a native instance of the received threat analysis.
However, corrective actions may be defined according to
other threat analyses that are mapped to the same smart
attribute as the received threat analysis. Selection of a
corrective action to be applied to the malware may be
derived from these other threat analyses that are mapped to
the same smart attribute as the received threat analysis. The
smart attribute, mapping all of these threat analyses together, may denote to the system or client 118 that the malware
underlying the various threat analyses are the same malware,
and may be treated as such. Any suitable corrective action
may be applied, such as alerting a user, alerting a system,
removing the malware, removing a malware attack vector,
updating software, disabling software, or sandboxing the
malware.

Method 500 may return to, for example, step 515.

Figure 6:
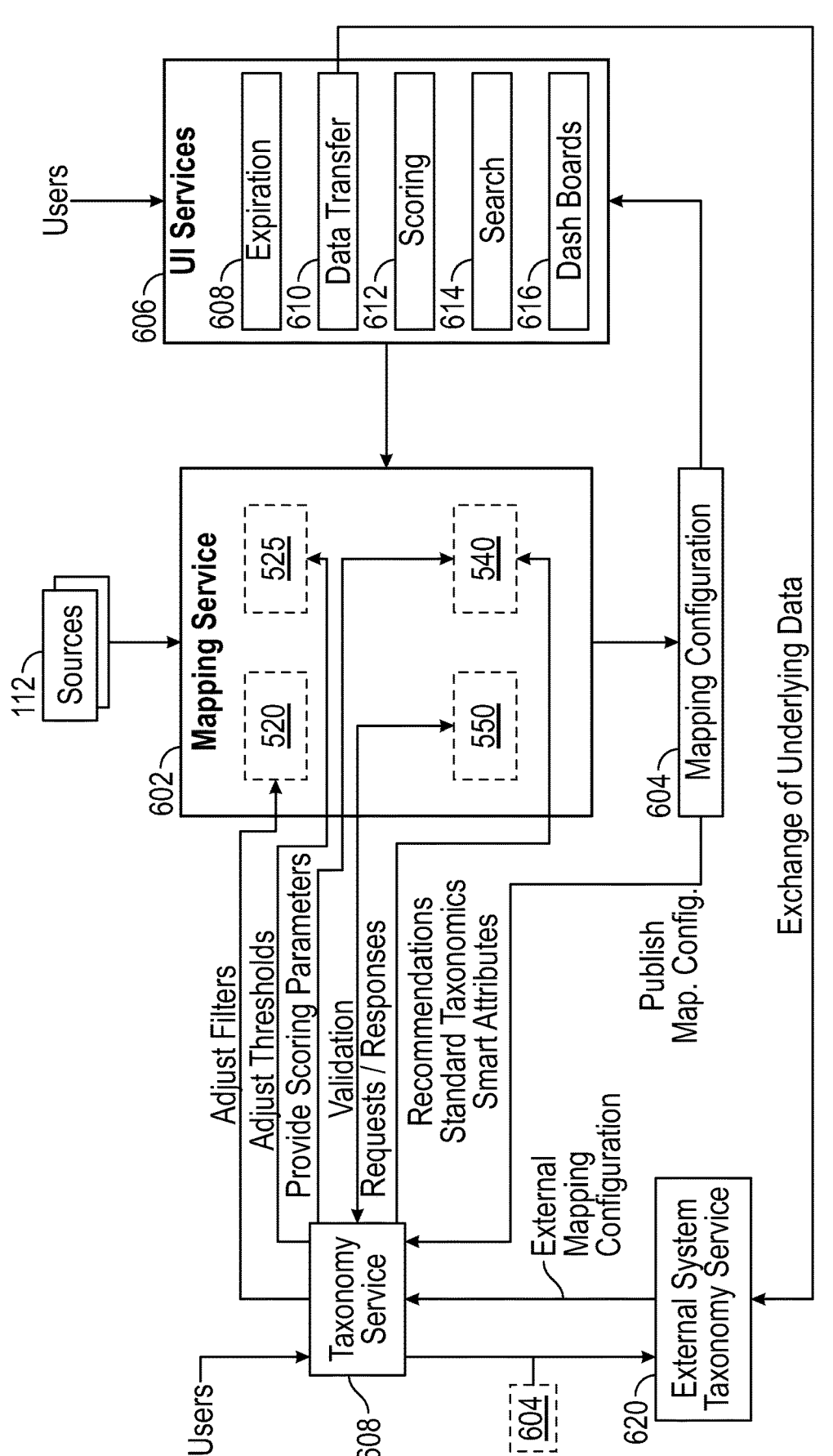
FIG. 6 is an illustration of an example workflow between different services in the system, according to embodiments of the present disclosure.

FIG. 6 is an illustration of an example workflow between
different services in system 100, according to embodiments
of the present disclosure. The services in FIG. 6 may include
services 104, although the services may instead be imple-
mented fully or in part instead by client services 118.

Services 104 or client services 118 may include a map-
ping service 602. Mapping service 602 may implement,
fully or in part, method 500 of FIG. 5. Moreover, FIG. 6 may
illustrate the operation of various elements of services 104
or client services 118 to act upon the steps of method 500 as
performed by mapping service 602.

Mapping service 602 may be configured to access any
suitable source systems 112 to generate a mapping configu-
ration 604. Mapping configuration 604 may include a map-
ping of a given threat indicator to a smart attribute. Mapping
configuration 604 may be used to interpret disparately
described or formatted threat analysis from source systems
112 to make anti-malware decisions.

Services 104 or client services 118 may include any
suitable number and kind of user interface (UI) services 606.
UI services 606 may utilize mapping configuration 604 to
interpret threat analysis from source systems 112. UI ser-
vices 606 may include, for example, an expiration service
608 defining the life cycle of a threat indicator, a data
transfer service 610 for exchanging threat analysis with
other systems, a scoring service 612 for providing param-
eters for scoring a threat indicator by mapping service 602,
a search service 614 for finding threat indicators in source
systems 112, and dashboards 616 for summarizing threat
analysis to users. UI services 604 may utilize mapping
configuration 604 to simplify and reduce presented threat
analysis to users.

Services 104 or client services 118 may include a tax-
onomy service 608. Taxonomy service 608 may be config-
ured to coordinate operation of services 104 or client ser-
vices 118 to provide and adjust mapping configuration 604,
as well as use mapping configuration 604. Taxonomy service
608 may be accessed by users who may be different or a
superset of the users who are allowed to access UI services
606. For example, the users of taxonomy service 608 may be
administrators of the system while the users of UI services
606 may more typically be end-users of the system.

Taxonomy service 608 may be configured to adjust fil-
tering of mapping service 602, such as the pre-filtering
performed in step 520. Taxonomy service 608 may be
configured to adjust thresholds for matching threat attri-
butes, such as those applied in step 520. Taxonomy service
608 may be configured to provide or adjust scoring param-
eters of threat attributes, such as those applied in step 540.
Taxonomy service 608 may be configured to validate map-
ping configuration candidates upon request, such as those
submitted in step 550. Taxonomy service 608 may be
configured to provide recommendations of mappings, stan-
dard taxonomies to be used, and pre-existing smart attri-
butes, such as those considered in step 540. These elements
may be stored in source systems 112, server database 110, or
provided directly or indirectly through user input to tax-
onomy service 608 or UI services 606.

Moreover, taxonomy service 608 may be configured to provide interfaces with other systems. Such other systems may be represented in FIG. 6 by external system taxonomy service 620, which may be an analogue of taxonomy service 608 executing on a different system. Taxonomy service 608, upon generation of a new mapping configuration 604, may store mapping configuration 604 in server database 110 and may share mapping configuration 604 with external system taxonomy service 620. Taxonomy service 608 may receive an external mapping configuration from external system taxonomy service 620, representing mapping decisions or determinations made by that system, similar to generation of mapping configuration 604 by mapping service 602. Taxonomy service 608 may provide this newly received external mapping configuration to mapping service 602, which may use the mapping in handling future threats, or may adjust existing mappings for the system based upon the newly received mapping. Moreover, data transfer service 620 may provide the underlying threat analysis to external system taxonomy service 610, whether directly or through taxonomy service 608. In addition, taxonomy service 608 or data transfer service 610 may receive underlying threat analysis from external system taxonomy service 610.

Figure 7:
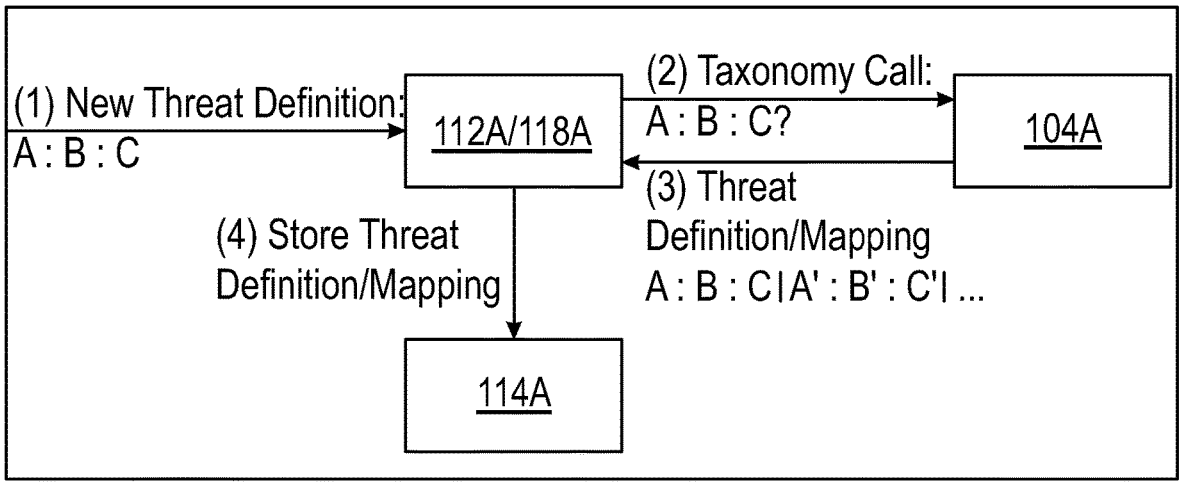
FIG. 7 is an illustration of operation of the system and, more particularly, of an instance of services in an instance of a server to respond to new threat definitions as reported by one or more instances of client services or source systems, according to embodiments of the present disclosure.

FIG. 7 is an illustration of operation of system 100 and, more particularly, of an instance of services 104A in an instance of server 102 to respond to new threat definitions as reported by one or more instances of client services 118A or source systems 112A, according to embodiments of the present disclosure. FIG. 7 may represent further operation of system 100 in addition to the operations discussed above. In particular, FIG. 7 may represent a pull or reactive operation of service 104A to a new threat definition as reported by client service 118A or source system 112A. Service 104A, client service 118A, and source system 112A may be operating as a software-as-a-service (SAAS), a server, website, application programming interface (API) server, script, library, or any other suitable mechanism. Service 104A, client service 118A, and source system 112A may be invoked, called, accessed, or otherwise communicated with in any suitable manner, such as by an API call, website request, or other suitable request. Service 104A and client service 118A may include instances of taxonomy service 608, mapping service 602, or any of UI services 606.

At (1), a new threat definition may be determined by or arrive at source system 112A or client service 118A. The threat definition may be identified through malware research, provided by source system 112A to client service 118A, provided by other systems, defined by a user, or any other suitable process. The threat definition may be referenced with a hierarchy and example values "A:B:C". Source system 112A or client service 118A, upon receiving or determining this new threat definition, at (2) may make a taxonomy call or request to service 104A regarding the new threat definition. For example, the client service 118A may be an instance of taxonomy service 608 or mapping service 602, and the service 104A may be another instance of taxonomy service 608 or mapping service 602.

Service 104A may receive the new threat definition and evaluate the threat definition as discussed above. The threat definition might already be known and mapped to a taxonomy or other definition. The threat definition may be new, and service 104A may be configured to determine a mapping, or candidate mappings, for the threat definition. This may be performed by, for example, execution of method 500. At (3), service 104A may issue such a threat definition or mapping back to client service 118A or source system 112A through any suitable process. This reply may include candidate mappings or a defined mapping, and may be given as "A':B':C'", representing any possible changes to A, B, or C, though a different hierarchy or entirely other values may in fact be provided by service 104A.

At (4), source system 112A or client service 118A may determine which candidate mapping to use, or may determine the identified mapping from service 104A, and store the threat definition and mapping in a suitable database, such as database 114A. Source system 112A or client service 118A may subsequently use the definition or mappings as locally stored or accessible.

Figure 8:
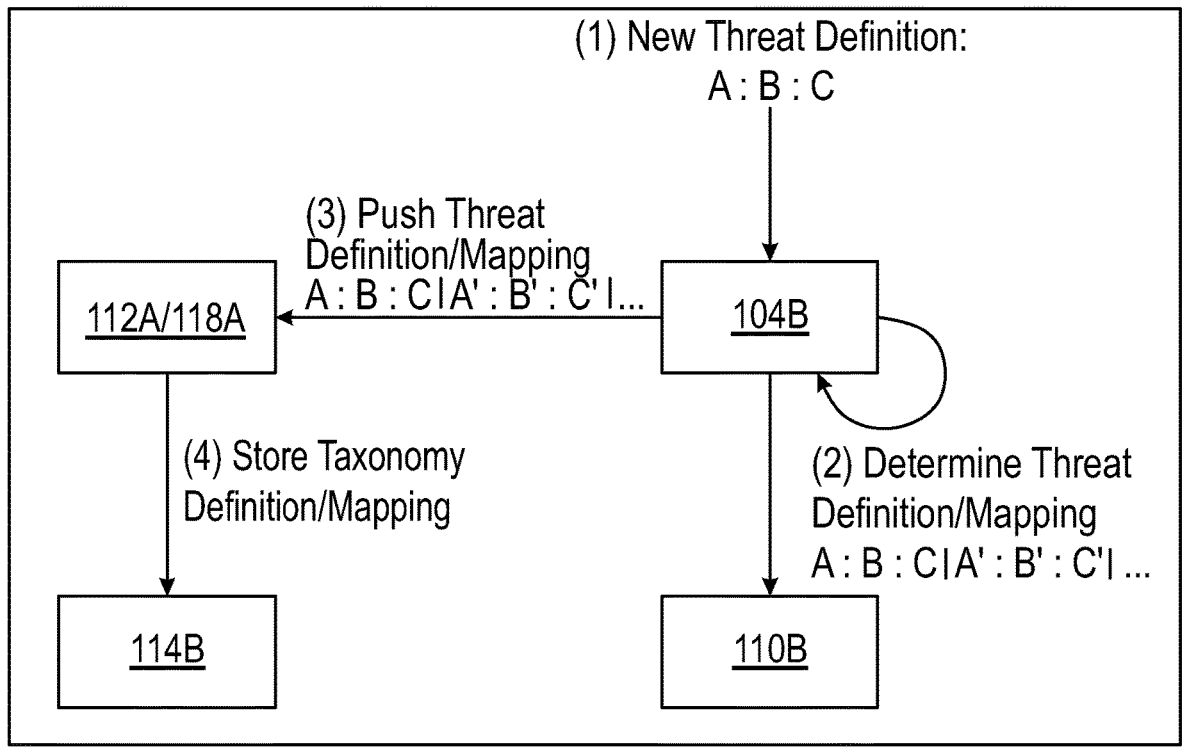
FIG. 8 is an illustration of operation of the system and, more particularly, of an instance of services in an instance of a server to provide new threat definitions to one or more instances of client services or source systems, according to embodiments of the present disclosure.

FIG. 8 is an illustration of operation of system 100 and, more particularly, of an instance of services 104B in an instance of server 102 to provide new threat definitions to one or more instances of client services 118B or source systems 112B, according to embodiments of the present disclosure. FIG. 8 may represent further operation of system 100 in addition to the operations discussed above. In particular, FIG. 8 may represent a push or proactive operation of service 104B to a new threat definition determined in any suitable manner. For example, a new threat may be reported by other instances of client service 118 or source system 112, such as client service 118A or source system 112A shown above in FIG. 6. Service 104B, client service 118B, and source system 112B may be operating as a SAAS, a server, website, API server, script, library, or any other suitable mechanism. Service 104B, client service 118B, and source system 112B may be invoked, called, accessed, or otherwise communicated with in any suitable manner, such as by an API call, website request, or other suitable request.

At (1), a new threat definition may be determined by or arrive at service 104B. The threat definition may be identified through malware research, provided from source systems 112 or client services 118, or any other suitable process. The threat definition may be referenced with a hierarchy and example values "A:B:C". Service 104B, upon receiving or determining this new threat definition, at (2) may evaluate the threat definition as discussed above. This process may include execution of method 500. The threat definition might already be known and mapped to a taxonomy or other definition. The threat definition may be new, and service 104B may be configured to determine a mapping, or candidate mappings, for the threat definition. Service 104B may store the mappings to an appropriate database, such as database 110B.

At (3), service 104B may issue such a threat definition or mapping to client service 118B or source system 112B through any suitable process. This reply may include candidate mappings or a defined mapping, and may be given as "A:B:C" representing the original threat information, or "A':B':C'", representing any possible changes to A, B, or C, though a different hierarchy or entirely other values may in fact be provided by service 104B.

At (4), source system 112B or client service 118B may determine which candidate mapping to use, or may determine the identified mapping from service 104B, and store the threat definition and mapping in a suitable database, such as database 114B. Source system 112B or client service 118B may subsequently use the definition or mappings as locally stored or accessible.

Those skilled in the art will understand that a number of variations may be made in the disclosed embodiments, all without departing from the spirit and scope of the invention, which is defined solely by the appended claims. The components of the system described above may be implemented in digital circuitry, analog circuitry, instructions for execution by a processor, or any suitable combination thereof.

What is claimed is:

1. An article of manufacture, comprising a non-transitory medium including machine-readable instructions, the instructions to be read and executed by a processor to cause the processor to:

receive a first malware analysis of a first known malware from a first computer security source database or feed, the first malware analysis to include a plurality of characterizations of the first known malware based upon a plurality of attributes of the first known malware, the attributes comprising at least a first key and a first value;

receive at least one other malware analysis, the other malware analysis of another known malware, from a second computer security source database or feed, wherein the other malware analysis to include a plurality of characterizations of the other known malware based upon a plurality of attributes of the other known malware, the attributes comprising at least a further key and a further value;

perform a fuzzy matching algorithm to quantify a similarity of the first malware analysis with the other malware analysis based upon at least the first key, the first value, the further key, and the further value, the fuzzy matching algorithm providing a fuzzy matching score;

determine that the first known malware is a same malware as the another known malware based upon results of the fuzzy matching algorithm including the fuzzy matching score, wherein the similarity is based upon matching one or more of the first key and the first value to one or more of the further key and the further value, wherein the first key and the further key are different; and designate a smart attribute, the smart attribute configured to map the first malware analysis and the other malware analysis together, the smart attribute configured to indicate that the same corrective action is to be taken upon subsequent receipt of the first malware analysis or the other malware analysis.

2. The article of claim 1, further including instructions for causing the processor to designate the other malware analysis as the smart attribute based upon an instance count of the first malware analysis compared to an instance count of the other malware analysis.

3. The article of claim 2, further including instructions for causing the processor to designate the other malware analysis as the smart attribute based upon the instance count of the first malware analysis being less than the instance count of the other malware analysis.

4. The article of claim 1, further including instructions for causing the processor to, map further instances of the first malware analysis to the second malware based upon the smart attribute.

5. A method, comprising:

receiving a first malware analysis of a first known malware from a first computer security source database or feed, the first malware analysis to include a plurality of characterizations of the first known malware based upon a plurality of attributes of the first known malware, the attributes comprising at least a first key and a first value;

receiving at least one other malware analysis, the other malware analysis of another known malware, from a second computer security source database of feed, wherein the other malware analysis to include a plurality of characterizations of the other known malware based upon a plurality of attributes of the other known malware, the attributes comprising at least a further key and a further value;

performing a fuzzy matching algorithm to quantify a similarity of the first malware analysis with the other malware analysis based upon at least the first key, the first value, the further key, and the further value, the fuzzy matching algorithm providing a fuzzy matching score;

determining that the first known malware is a same malware as the another known malware based upon results of the fuzzy matching algorithm including the fuzzy matching score, wherein the similarity is based upon matching one or more of the first key and the first value to one or more of the further key and the further value, wherein the first key and the further key are different; and designating a smart attribute, the smart attribute configured to map the first malware analysis and the other malware analysis together, the smart attribute configured to indicate that the same corrective action is to be taken upon subsequent receipt of the first malware analysis or the other malware analysis.

6. The method of claim 5, further comprising designating the other malware analysis as the smart attribute based upon an instance count of the first malware analysis compared to an instance count of the other malware analysis.

7. The method of claim 6, further comprising designating the other malware analysis as the smart attribute based upon the instance count of the first malware analysis being less than the instance count of the other malware analysis.

8. The method of claim 5, further comprising mapping further instances of the first malware analysis to the other malware based upon the smart attribute.

* * * * *